July 10, 1951 L. V. MARKS ET AL 2,559,778

INTERCOMMUNICATION TELEPHONE SYSTEM

Filed Oct. 13, 1949

INVENTORS

LEONARD VICTOR MARKS

DAVID WILLIAM BRISCOMB

By: [signature]

ATTORNEY

Patented July 10, 1951

2,559,778

UNITED STATES PATENT OFFICE 2,559,778

INTERCOMMUNICATION TELEPHONE SYSTEM

Leonard Victor Marks and David William Briscomb, Willesden, England, assignors to Modern Telephone Corporation, New York, N. Y., a corporation of New York Application October 13, 1949, Serial No. 121,154
In Great Britain April 2, 1948

4 Claims. (Cl. 179—37)

Figures 1, 2:
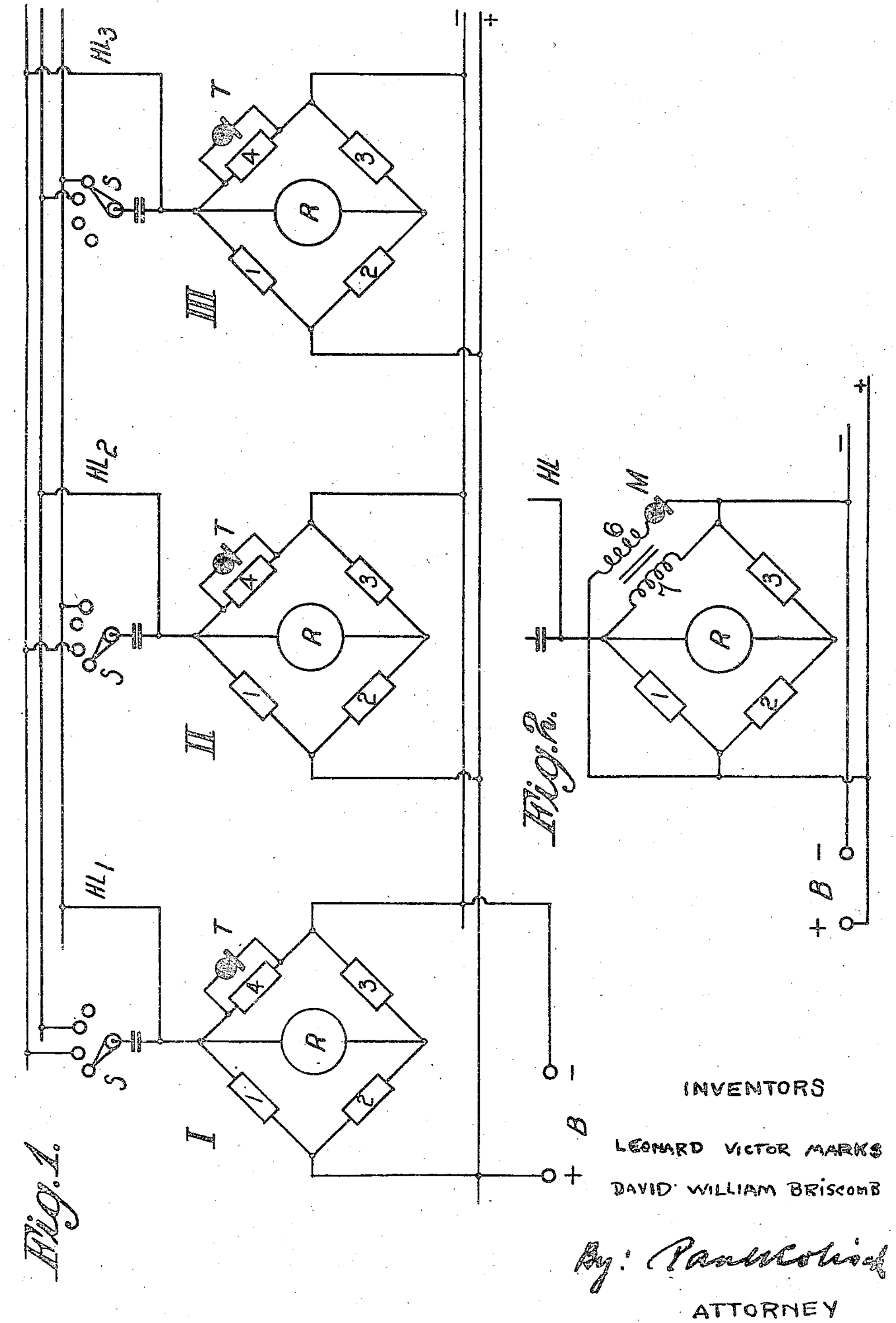

This invention relates to intercommunication telephone systems which employ a single line for each telephone in the system and common battery feed wires. Its purpose is to reduce cross-talk or overhearing due to internal resistance of the battery, resistance of the battery feed wires and of the common return of the speaking circuits, capacitance of the speaking lines or low insulation resistance between them, or to other causes.

According to the invention the microphone is included in one arm of a Wheatstone bridge network, the other arms of which may consist of resistance, or reactance, or resistances and reactances, and the receiver is connected to one terminal of the transmitter and across one diagonal of the bridge and the battery across the other diagonal; the speaking line of the station and also the pivot or bus-bar of its selector are connected to the common terminal of the microphone and receiver.

If a transformer is required the secondary winding of the transformer is included in one arm of the bridge in lieu of the microphone, and the primary winding and the microphone are included in series between the battery and that end of the secondary winding which is not connected to the receiver. The term "transmitter" is used hereinafter to include either the microphone itself, or the secondary winding of the microphone transformer if one is used.

The impedances of the bridge are adjusted so that the bridge is substantially balanced so that voltage variations set up across the battery terminals of the bridge send little or no current through the receiver; for this purpose, if necessary, there may be impedance in the microphone arm in parallel, or even in series with the microphone. Cross-talk voltages in the voice frequency range, when they appear between the common battery wires, due to internal resistance of the battery and resistance of the battery feed wires will also not affect the receiver, when the impedance values are such as to balance for the mean speech frequency range.

Both battery feed wires form the return line of the speaking circuits, and the resistance of this line is therefore lower than in systems using only one battery wire as the return line. This return line will be common to all speaking circuits in use, so the reduction of its resistance contributes to lessening cross-talk voltages arising in it.

Further features of the invention will now be described with reference to the accompanying drawings which show, by way of example, specific embodiments of the invention. In the drawings, Figure 1 is a diagram of connections showing three stations of a system not employing transformers, and Figure 2 is a diagram of connections of a single station employing a microphone transformer.

The drawing Figure 1 shows only the essentials of the speaking circuit of an intercommunication telephone system according to the invention, details regarding the calling, or other signalling circuits, being omitted.

The transmitter T is included in one arm of a Wheatstone bridge completed by resistance or reactance, or resistances and reactances, 1, 2 and 3. The receiver R is connected across one diagonal of the bridge so that it has a common terminal with the transmitter T, and the battery B is connected across the other diagonal. The home line HL1, HL2 and HL3 respectively of each station I, II, III and so on is connected at the home station to the junction of its receiver and transmitter, and via condenser C to the common terminal of its selector S, and at other stations to a contact of their selectors.

The local microphone feeding circuit is closed over the negative side of battery B, the branch comprising transmitter T in parallel with impedance 4, and impedance 1 to the positive side of battery B; this circuit being bridged by impedances 2 and 3. The bridge circuit being substantially balanced, will permit little or no battery current to pass through the receiver R, thus, the receiver will be unaffected by any speech voltage appearing between the battery lines. When the connection is established over a station selector S, as shown by example for station III, over the contact and line $HL_1$ of a called station I, the speaking circuit for the calling station may be traced as follows: negative battery B, transmitter $T_3$ in parallel with impedance 4 of the calling station, then by several paths in parallel, namely impedance 1 of the calling station, receiver $R_3$ and impedance 2 of the calling station, condenser $C_3$, station selector $S_3$, home line $HL_1$ and impedance 1 of the called station, and home line $HL_1$, receiver $R_1$ and impedance 2 of the called station to battery positive and also via transmitter $T_1$ and impedance 3 of the called station to battery positive.

If a transformer is used the connections are modified as indicated in Figure 2. The transmitter now consists of the secondary winding 7 of a transformer, the primary winding 6 of which is joined in series with the microphone M in the connection between battery B and the Wheatstone bridge network.

When only resistors 1—4 are employed on the bridge circuit shown by the example, quite satisfactory results are obtained both regarding freedom from cross-talk and efficiency of speech transmission. With the central battery type of carbon microphones, suitable resistance values are: resistor 1: 150 ohms, resistors 2 and 3: 220 ohms each, resistor 4: 470 ohms.

Some improvement in transmission efficiency can be obtained by employing an impedance instead of or in series with the resistor 3 and the balancing resistor 1, which will retard voice frequencies generated in the transmitter from reaching the battery.

We claim:

1. An intercommunication telephone system comprising a plurality of stations; a Wheatstone bridge circuit at each station, each bridge having a receiver connected across one diagonal, a transmitter in one of the arms and means in the other arms substantially to balance said bridge; a battery, and a circuit for connecting the battery to the other diagonal of each bridge; a circuit for connecting the stations to one another, said circuit including a station line connected to the junction point of the receiver and transmitter; and a station selector connected to said junction for selecting other station lines.

2. An intercommunication telephone system comprising a plurality of stations, a circuit connecting the stations to one another; a Wheatstone bridge circuit substantially balanced at each station, a transmitter included in one arm and a receiver connected across one diagonal of each of said bridges; a station selector connected to each bridge at the junction point of the receiver and transmitter; a battery, and a circuit for connecting the battery across the other diagonal of each bridge.

3. An intercommunication telephone system having a plurality of stations and a circuit for interconnecting the stations; each station comprising a Wheatstone bridge having resistive arms, a transmitter included in one arm of said bridge, a receiver connected to said transmitter and across one diagonal of said bridge; a station selector connected to the bridge at the junction point of the receiver and transmitter; a battery, and a circuit for connecting the battery across the other diagonal of the bridge.

4. An intercommunication telephone system having a plurality of stations and a circuit for interconnecting the stations; a substantially balanced Wheatstone bridge having resistive arms at each station, a transmitter in parallel with one of said resistive arms, a receiver connected to said transmitter and across one diagonal of the bridge; a station selector connected to the bridge at the junction point of the receiver and transmitter; a battery, and a circuit for connecting the battery across the other diagonal of each bridge.

LEONARD VICTOR MARKS.
DAVID WILLIAM BRISCOMB.

REFERENCES CITED

The following references are of record in the file of this patent:

UNITED STATES PATENTS

| Number | Name | Date |
|---|---|---|
| 2,332,643 | Johnson | Oct. 26, 1943 |
| 2,358,630 | Fay | Sept. 19, 1944 |
| 2,449,344 | Tschumi | Sept. 14, 1948 |
| 2,461,945 | Tschumi | Feb. 15, 1949 |